United States Patent [19]

Maruyama et al.

[11] Patent Number: 4,897,967
[45] Date of Patent: Feb. 6, 1990

[54] APPARATUS FOR TRUING A GRINDING WHEEL

[75] Inventors: Toshio Maruyama; Yukio Oda, both of Kariya; Syoji Yamaguchi, Nagoya, all of Japan

[73] Assignee: Toyoda Koki Kabushiki Kaisha, Kariya, Japan

[21] Appl. No.: 6,162

[22] Filed: Jan. 23, 1987

[30] Foreign Application Priority Data

Jan. 23, 1986 [JP] Japan ................................ 61-12800

[51] Int. Cl.$^4$ ............................................. B24B 49/00
[52] U.S. Cl. ............................. 51/165.87; 51/165.71; 51/165.77; 125/11 CD; 125/11 CW
[58] Field of Search ........... 51/165.87, 165.88, 165.77, 51/165.80, 50; 125/11 CD, 11 CW, 11 R

[56] References Cited

U.S. PATENT DOCUMENTS 4,071,980 2/1978 Kubo ............................... 51/165.87
4,163,346 8/1979 Matson ........................ 51/165.87 X

FOREIGN PATENT DOCUMENTS 2423304 4/1978 France .............................. 51/165.88

Primary Examiner—Frederick R. Schmidt
Assistant Examiner—Shirish Desai
Attorney, Agent, or Firm—Oblon, Fisher, Spivak, McClelland & Maier

[57] ABSTRACT

An apparatus for truing the cylindrical outer peripheral grinding surface of a grinding wheel includes a truing head which is movable toward or away from the grinding wheel in a first direction which is parallel to the grinding surface and in a second direction which is perpendicular to the first direction. A truing wheel is rotatably supported on the truing head, has a truing surface and is movable with the truing head for truing the grinding surface. A contacting detection member is secured to the truing head, projects therefrom toward the grinding surface and has an end surface which can be brought into contact with the grinding surface. A device is provided for detecting the contact of the end surface of the detection member with the grinding surface and producing an output signal upon detecting their contact. Three feed control devices are provided to move the truing head in various directions. Detecting devices and memories are provided for detecting the position of the truing head and for controlling movement of the head.

5 Claims, 5 Drawing Sheets

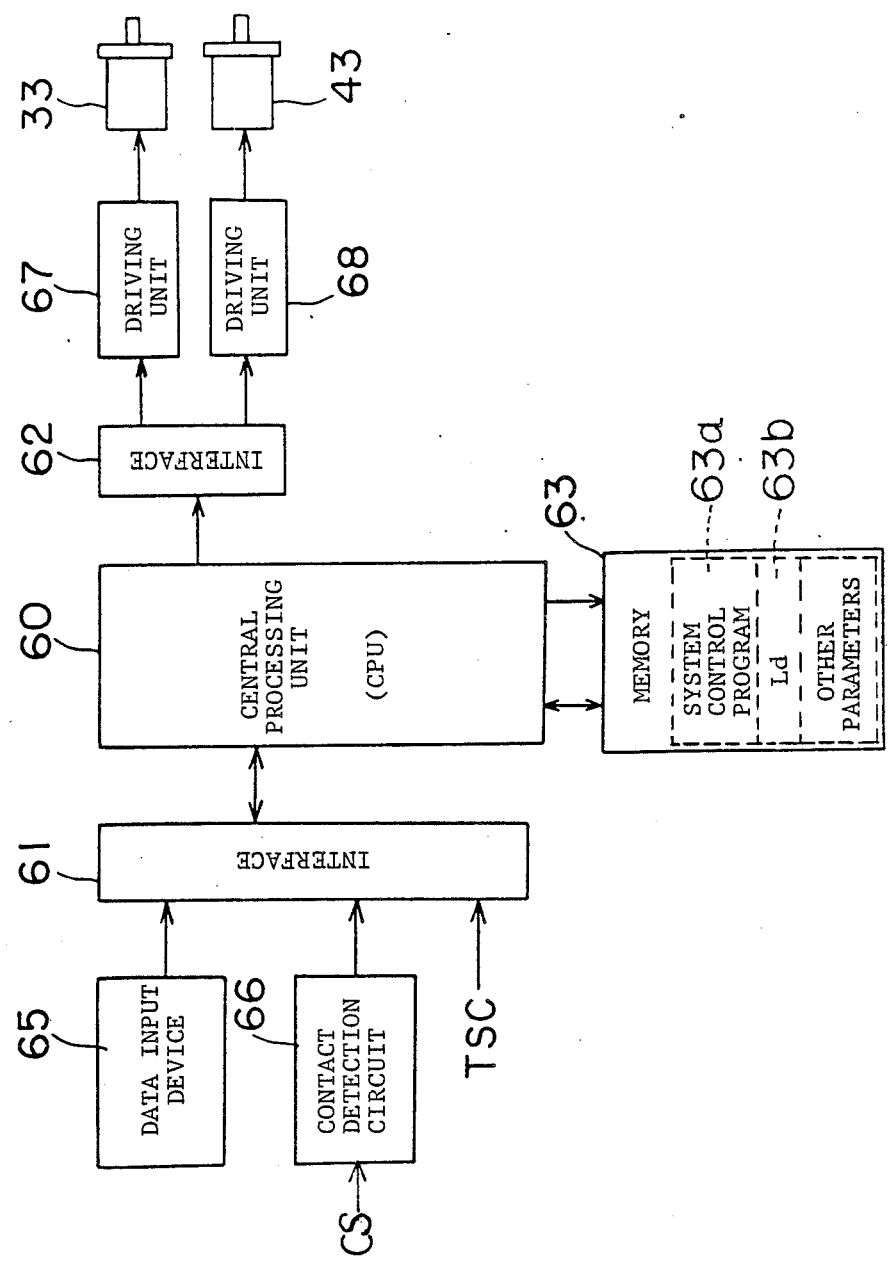

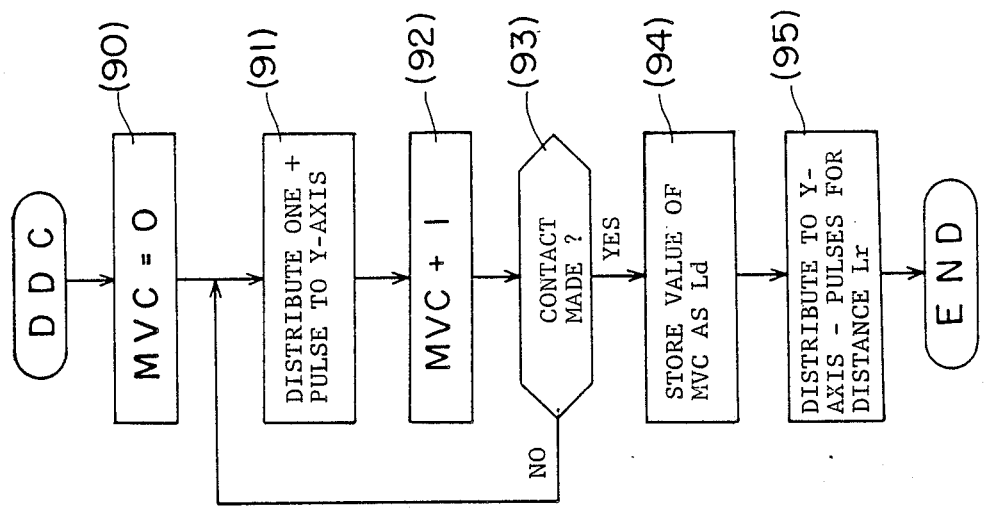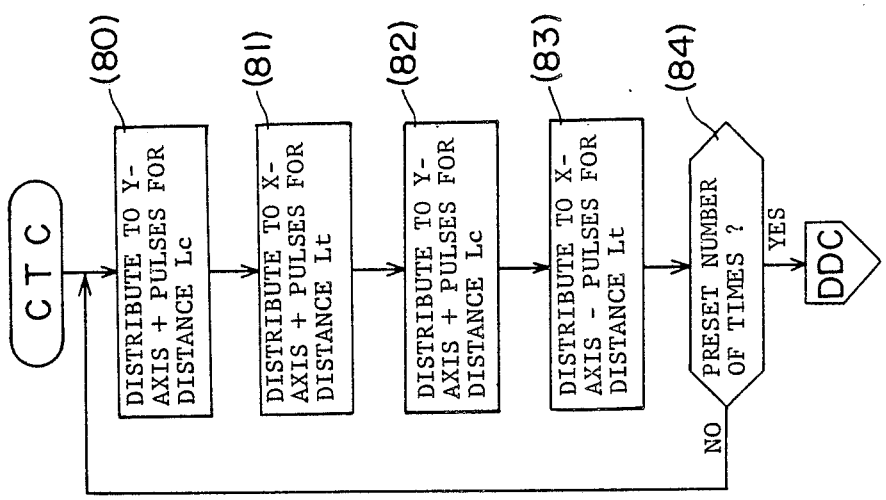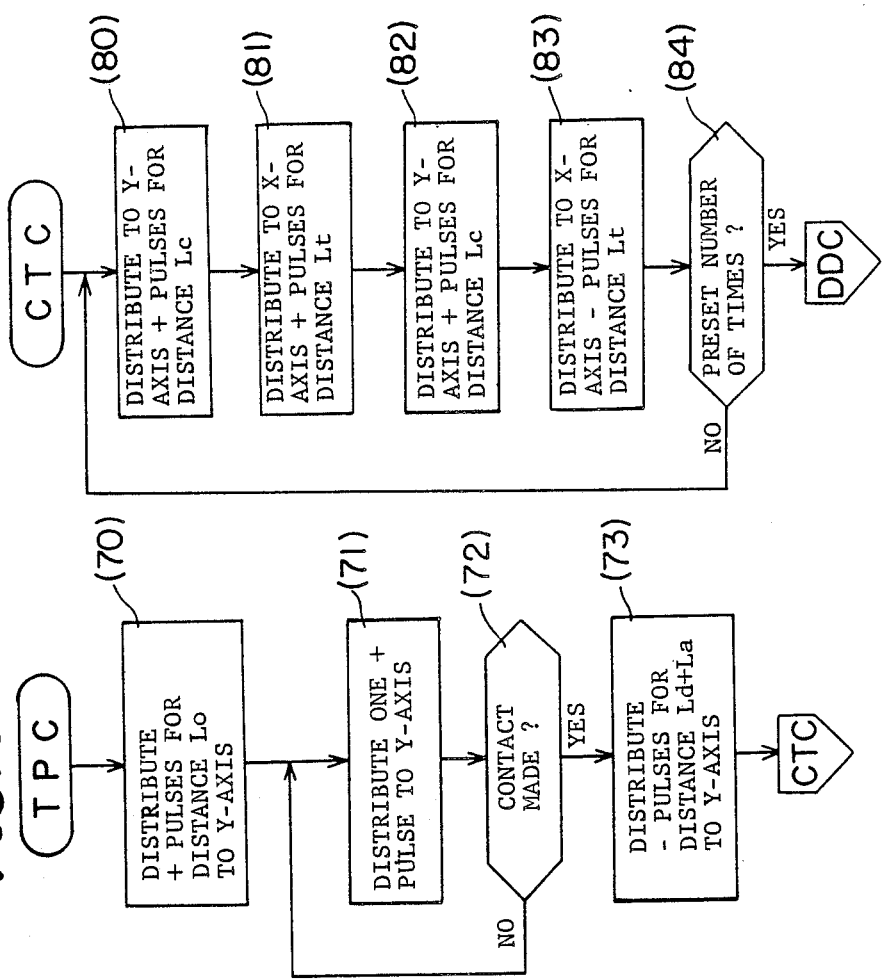

APPARATUS FOR TRUING A GRINDING WHEEL

BACKGROUND OF THE INVENTION

1. Field of the Invention

This invention relates to an apparatus for truing a grinding wheel. More particularly, it is a truing apparatus including a truing tool mounted on a truing head which is movable relative to a grinding wheel in parallel to the outer peripheral surface thereof and at right angles thereto to move the tool to its truing position.

2. Discription of the Prior Art

A truing tool is employed in a grinding machine for truing a grinding wheel which comprises a metal disk, as of aluminum, having an outer peripheral surface carrying thereon a layer of hard abrasive grains of cubic boron nitride. The thermal expansion or contraction of the grinding wheel, however, causes the position of its outer peripheral surface to change relative to the truing tool. It is, therefore, difficult to ensure the accurate movement of the truing tool by a distance which is required for its proper truing operation.

In this connection, U.S. Pat. No. 4,266,374 to H. Asano et al. shows a truing apparatus including a detection member mounted on a truing head movably toward a grinding wheel so as to be ground by the grinding wheel which has been trued, so that it may be aligned with a truing wheel on the outer periphery of the grinding wheel, and so that the contact of the detection member with the outer peripheral surface of the grinding wheel may be detected to provide a basis for controlling the distance by which the truing wheel is moved for truing the grinding wheel.

This apparatus has, however, the following drawbacks:

(1) It is complicated in construction, since it requires a mechanism for feeding the contact detection member by a certain distance toward the truing head whenever the grinding wheel has been trued; and (2) As the contact detection member is ground whenever the grinding wheel has been trued, it is worn out rapidly and need be changed to a new one frequently.

SUMMARY OF THE INVENTION

It is, therefore, an object of this invention to provide a truing apparatus including a contact detection member of which the movement toward a truing head does not require any special mechanism, and which is not easily worn out.

It is another object of this invention to provide a truing apparatus having a contact detection member which does not need to be maintained in a fixed position relative to the front end of a truing tool.

The truing apparatus of this invention includes a contact detection member secured on a truing head and projecting toward the outer peripheral surface of a grinding wheel. A device is provided for detecting the contact of the detection member with the outer peripheral surface of the grinding wheel. A device is provided for detecting a positional difference between the front ends of a truing tool on the truing head and the contact detection member and storing it in memory. A first feed control device is provided for moving the truing head immediately after the outer peripheral surface of the grinding wheel has been trued and the front end of the truing tool has, therefore, been aligned with the outer peripheral surface of the grinding wheel. The truing head is moved until the contact detecting device outputs a signal indicating the contact of the contact detection member with the outer peripheral surface of the grinding wheel. A memory renewal device is provided for detecting the distance of such movement of the truing head and renewing the memory of the positional difference between the truing tool and the contact detection member as stored in the positional difference detecting device. If an instruction is given to start the truing operation, the contact detection member is first brought into contact with the outer peripheral surface of the grinding wheel and the position of the truing tool relative to the outer peripheral surface of the grinding wheel is determined in accordance with the memory of the positional difference detecting device to provide a starting point for the truing operation in accordance with a predetermined cycle.

According to this invention, no mechanism is required for aligning the front ends of the truing tool and the contact detection member. No grinding is required of the contact detecting member for adjusting its position, but it can be used satisfactorily for a long period of time.

BRIEF DESCRIPTION OF THE DRAWINGS

FIG. 2 is a block diagram of an electrical system for the truing apparatus;

FIGS. 3($a$), 3($b$) and 3($c$) are flow charts showing three successive cycles of operation;

DETAILED DESCRIPTION OF THE PREFERRED EMBODIMENT

Figure 1:
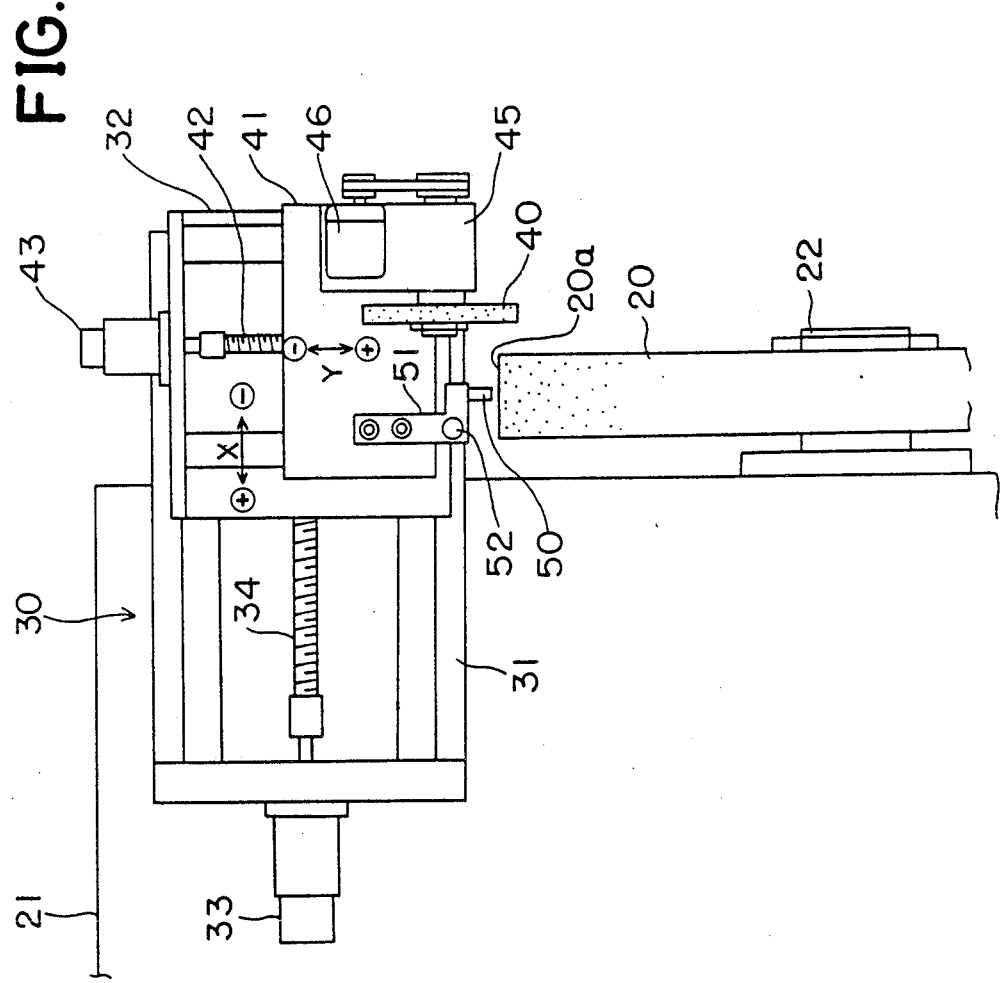
FIG. 1 is a top plan view of a truing apparatus embodying this invention.
Figure 4:
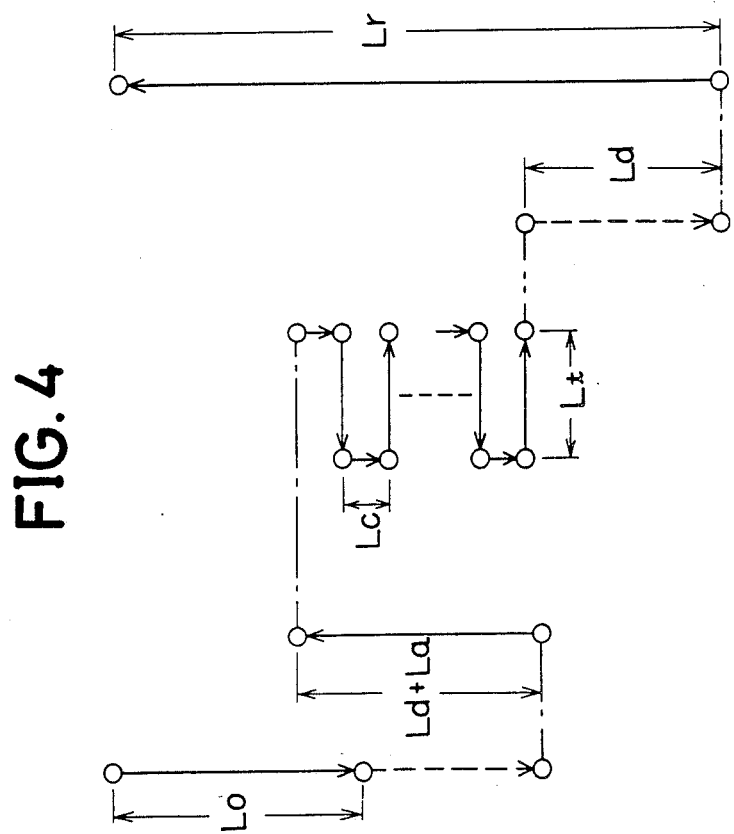
FIG. 4 is a diagram showing the cycles of operation together.
Figure 5:
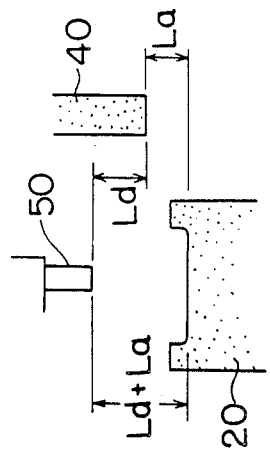
FIGS. 5A–5F show a series of views which explain the operation of the truing apparatus.
Figure 5:
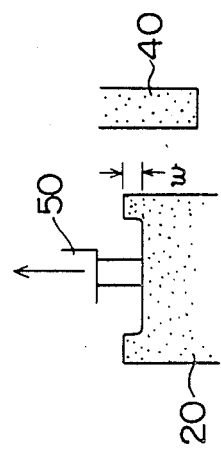
Figure 5:
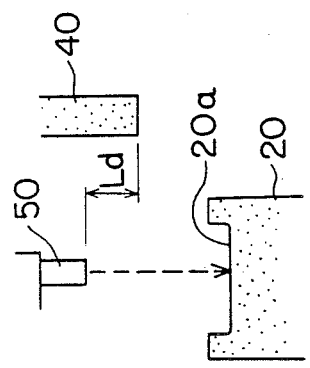
Figure 5:
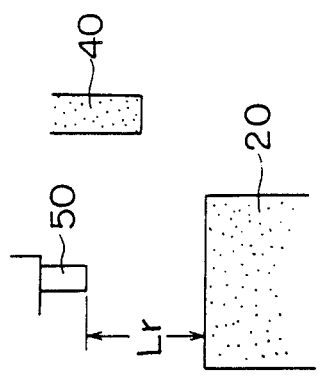
Figure 5:
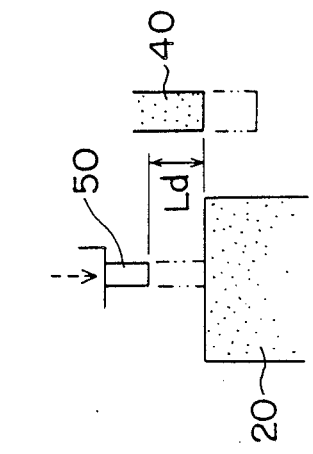
Figure 5:
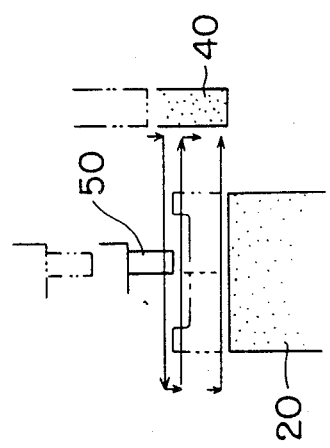

Referring to FIG. 1 of the drawings, there is shown a truing apparatus embodying this invention with a grinding wheel 20. The grinding wheel 20 is supported on one end of a wheel shaft 22 which is rotatably supported on a wheel support 21. A pulley not shown is provided at the other end of the wheel shaft 22 for transmitting the rotation of a driving motor not shown thereto to thereby rotate the grinding wheel 20.

The truing apparatus of this invention is provided behind the grinding wheel 20 and is generally shown at 30. A support base 31 is secured on the wheel support 21 and a traverse carriage 32 is supported on the support base 31 movably in parallel to the axis of rotation of the grinding wheel 20. The traverse carriage 32 is movable by a feed screw 34 connected directly to the output of a traverse servo motor 33. When the traverse carriage 32 stays in its original position as shown in FIG. 1, the truing apparatus 30 is so positioned relative to the grinding wheel 20 that a contact detection member 50 is directed toward the widthwise center of the outer peripheral surface of the grinding wheel 20, while a truing tool 40 stays away from the outer peripheral surface of the grinding wheel 20.

A truing head 41 is mounted on the traverse carriage 32 for moving the truing tool 40 in either direction that is perpendicular to the outer peripheral surface 20$a$ of the grinding wheel 20. A feed screw 42 has one end which is threadedly connected with the truing head 41 and the other end thereof is directly connected to the output shaft of an infeed control servo motor 43. If the servo motor 43 is rotated, the truing head 41 is movable to or away from the outer peripheral surface 20a of the grinding wheel 20. A supporting block 45 is provided on the truing head 41 for supporting the truing tool 40 rotatably. A driving motor 46 is mounted on the block 45 for rotating the truing tool 40. The truing tool 40 may, for example, comprise a diamond roll.

The contact detection member 50 is secured to the truing head 41 by a connecting member 51 in a laterally spaced apart relation from the truing tool 40. The contact detection member 50 has a front end spaced back from the front end of the outer peripheral surface of the truing tool 40 by a distance Ld which varies with a difference in the amount of wear between the tool 40 and the detection member 50. The connecting member 51 is provided with a vibration detector which comprises a contact sensor 52.

An electrical system for the truing apparatus is shown in FIG. 2. It is controlled by an electronic computer system which comprises a central processing unit (CPU) 60, two interfaces 61 and 62 located between the CPU 60 and the input and output devices, respectively, and a memory 63. A data input device 65 and a contact detection circuit 66 are connected to the CPU 60. The circuit 66 is provided for receiving a contact signal CS from the contact sensor 52 and detecting the contact of the contact detection member 50 with the outer peripheral surface 20a of the grinding wheel 20. Two driving units 67 and 68 for driving the servo motors 33 and 43, respectively, are connected to the CPU 60 through the interface 62. The memory 63 has an area 63a for storing a system control program as shown in FIGS. 3(a) to 3(c), and an area 63b for storing the distance Ld or the positional difference between the front ends of the truing tool 40 and the contact detection member 50.

Description will now be made of the operation of the apparatus with reference to FIGS. 3(a) to 3(c), 4 and 5. If a truing start command TSC is given to the CPU 60, it starts a truing tool positioning cycle as shown in FIG. 3(a). It first performs Step 70 to distribute positive pulses to the driving unit 68 to move the truing head 41 by a predetermined distance Lo from its original position to the grinding wheel 20. Then, it repeats Steps 71 and 72 and distributes one or more pulses each time to the driving unit 68 until the contact detection circuit 66 outputs a contact detection signal. As a result, the truing tool 40 and the contact detection member 50 are moved from their positions shown at (a) in FIG. 5 to their positions shown at (b) in which the free end of the contact detection member 50 contacts the output peripheral surface 20a of the grinding wheel 20. Steps 70 to 72 constitute a second feed control device.

Then, the CPU 60 proceeds to Step 73 and distributes then necessary pulses to retract the truing head 41 by a distance Ld+La in which La is a predetermined distance of relief. As a result, the truing tool 40 is correctly positioned so that its outer peripheral surface may be spaced apart by the distance La from the worn central portion of the outer peripheral surface 20a of the grinding wheel 20, as shown at (c) in FIG. 5. The worn central portion results from the use of the grinding machine for grinding, for example, a cam shaft. Whenever the grinding wheel is used in any such situation, the distance La of relief need be greater than the amount of wear w of the central portion of its outer peripheral surface. On the other hand, the distance La can be reduced to substantially zero if the grinding wheel is worn uniformly along the entire width of its outer peripheral surface.

Then, the CPU 60 proceeds to a truing cut and traverse cycle as shown in FIG. 3(b). It repeats a preset number of times the distribution of pulses for moving the truing tool 40 to cut a predetermined amount Lc of material from the grinding wheel 20 (Steps 80 and 82) and the distribution of pulses for traversing the tool 40 by a predetermined distance Lt (Steps 81 and 83), so that the tool 40 may true the outer peripheral surface 20a of the grinding wheel 20 as shown at (d) in FIG. 5. Step 73 in FIG. 3(a) and Steps 80 to 84 in FIG. 3(b) constitute a third feed control device.

The CPU 60, then, proceeds to a distance determining cycle as shown in FIG. 3(c) to determine the distance Ld between the outer peripheral surface of the truing tool 40 and the free end of the contact detection member 50. After resetting a feed pulse cut area MVC at Step 90, the CPU 60 distributes pulses to move the truing head 41 toward the outer peripheral surface 20a of the grinding wheel 20 until the contact detection circuit 66 outputs a contact detection signal (Steps 91 and 93), and detects the distance of its movement (Step 92). If it knows at Step 93 that the the circuit 66 has outputted a contact detection signal, the CPU 60 proceeds to Step 94 and stores the detected distance for renewing the memory in the distance storing area 63b of the distance Ld between the outer peripheral surface of the truing tool 40 and the free end of the contact detection member 50. Then, the truing head 41 is retracted by a certain distance Lr to its position in which another truing job can be started. Steps 91 and 93 constitute a first feed control device and Steps 92 and 94 constitute a distance detecting device.

The procedures as hereinabove described make it possible to determine accurately the distance Ld between the outer peripheral surface of the truing tool 40 and the free end of the contact detection member 50 immediately after each truing job, irrespective of the wear of the tool 40 or the detection member 50, and renew the memory thereof.

The grinding wheel 20 which has been trued is used for grinding workpieces. When it has been used for grinding a predetermined number of workpieces, it is trued again in accordance with the cycles shown in FIGS. 3(a) to 3(c).

As the outer peripheral surface of the truing tool 40 and the free end of the contact detection member 50 have their distance Ld determined accurately after the immediately preceding truing job, the truing tool positioning cycle of FIG. 3(a) positions the outer peripheral surface of the tool 40 correctly at a distance La from the outer peripheral surface 20a of the grinding wheel 20. Therefore, the truing cut and traverse cycle of FIG. 3(b) enables the truing tool 40 to move toward the outer peripheral surface 20a of the grinding wheel 20 exactly by a predetermined distance for truing it.

According to this invention, the distance between the outer peripheral surface of the truing tool and the free end of the contact detection member is determined and stored immediately after each truing job and is used for controlling the movement of the truing tool for another truing job after the contact detection member has been brought into contact with the outer peripheral surface of the grinding wheel, as hereinabove described. Therefore, the contact detection member which is secured on the truing head enables the accurate control of the truing operation. The apparatus of this invention does not require any mechanism in particular for advancing the contact detection member by a certain distance prior to each truing job, and is, therefore, greatly simplified in construction.

According to this invention, moreover, it is not necessary to grind the free end of the contact detection member to maintain a constant positional relationship between the outer peripheral surface of the truing tool and the free end of the contact detection member. Therefore, the contact detection member is not easily worn, but has a greatly prolonged life.

Obviously, numerous variations and modifications of the present invention are possible in light of the above teachings. It is therefore to be understood that within the scope of the appended claims, the present invention may be practiced otherwise than as specifically described herein.

What is claimed is:

1. An apparatus for truing a rotatably supported grinding wheel having a grinding surface at its outer circumferential portion thereof, comprising:

a truing head movable relative to said grinding wheel in a first direction parallel to said grinding surface of said grinding wheel and in a second direction perpendicular to said first direction;

a truing tool supported on said truing head;

a contact detection member secured to said truing head and engageable with said grinding surface of said grinding wheel;

a contact detection device for generating a contact signal when said contact detection member is brought into contact with said grinding surface of said grinding wheel through relative movement between said truing head and said grinding wheel in said second direction;

gap memory means for storing a gap between edges close to said grinding wheel of said truing tool and said contact detection member in said second direction;

first and second feed means for effecting relative movement between said truing head and said grinding wheel in said first and second directions, respectively; and a feed control device for controlling, in response to said contact signal from said contact detection device and based on said gap stored in said gap memory means, said first and second feed means in accordance with a predetermined cycle so as to true said grinding wheel, said feed control device including:

first feed control means operable when said edge of said truing tool is in alignment with said grinding surface of said grinding wheel upon completion of a previous truing operation, for moving said truing head relative to said grinding wheel in said second direction until said contact signal is generated;

gap detection means for detecting a distance through which said truing head is moved relative to said grinding wheel under the control of said first feed control means; and data setting means for storing said distance detected by said gap detection means in said gap memory means so as to renew said gap stored therein for use in positioning said truing tool relative to said grinding wheel in a subsequent truing operation.

2. An apparatus as set forth in claim 1, wherein said feed control device further includes:

second feed control means responsive to a truing command for moving said truing head forward in said second direction relative to said grinding wheel until said contact signal is generated, and thereafter, for moving said truing head backward by a distance which is determined depending on said gap stored in said gap memory means; and third feed control means operable immediately after the operation of said second feed control means, for performing an infeed of said truing head in said second direction and a traverse feed of said truing head in said first direction so as to true said grinding wheel.

3. An apparatus as set forth in claim 2, wherein said distance by which said truing head is moved backward is greater than said gap stored in said gap memory means, and wherein said third feed control means, when operated immediately after the operation of said second feed control means, controls said first and second feed means for repetitively performing said infeed and traverse feed of said truing head a number of times.

4. An apparatus as set forth in claim 3, wherein said distance by which said truing head is moved backward is greater than the sum of said gap which is stored in said gap memory means and the thickness of abrasion which locally occurs at said grinding surface of said grinding wheel as a result of use for a grinding job.

5. An apparatus for truing a circumferential grinding surface of a grinding wheel rotatably carried by a frame, said apparatus comprising:

a truing head carried on said frame for movements in first and second directions which are respectively parallel and perpendicular to said grinding surface of said grinding wheel;

a truing tool provided on said truing head for truing said grinding surface;

contact detection means including a detection member secured to said truing head for generating a contact signal when said detection member is brought into contact with said grinding surface;

first and second feed means drivingly connected to said truing head for moving the same respectively in said first and second directions;

first feed control means operable immediately after said grinding surface is trued with said truing tool in a previous truing operation, for controlling said second feed means to move said truing head toward said grinding wheel until said contact signal is generated;

gap memory means for storing, as a gap between edges close to said grinding surface of said truing tool and said detection member in said second direction, a distance through which said truing head is moved under the control of said first feed control means;

second feed control means responsive to a truing command for a subsequent truing operation, for controlling said second feed means to move said truing head toward said grinding wheel until said contact signal is generated; and third feed control means for controlling said first and second feed means to reciprocatively move said truing head in said first direction and to intermittently move said truing head toward said grinding surface in said second direction after the relative position of said truing tool to said grinding wheel is re-established through the contact of said detection member with said grinding surface and by reference to said gap stored in said gap memory means.

* * * * *